US010326880B2

(12) United States Patent
Kulkarni et al.

(10) Patent No.: US 10,326,880 B2
(45) Date of Patent: Jun. 18, 2019

(54) SYSTEM AND METHOD FOR INTEGRATED CX-AX CONTACT CENTER TESTING

(71) Applicant: Cyara Solutions Pty Ltd, Hawthorn, VIC (AU)

(72) Inventors: Alok Kulkarni, Glen Iris (AU); Geoff Willshire, Greenslopes (AU)

(73) Assignee: Cyara Solutions Pty Ltd, Hawthorn (AU)

( * ) Notice: Subject to any disclaimer, the term of this patent is extended or adjusted under 35 U.S.C. 154(b) by 0 days.

(21) Appl. No.: 15/963,704

(22) Filed: Apr. 26, 2018

(65) Prior Publication Data
US 2019/0007550 A1 Jan. 3, 2019

Related U.S. Application Data

(60) Provisional application No. 62/528,413, filed on Jul. 3, 2017.

(51) Int. Cl.
| | |
|---|---|
| H04M 3/28 | (2006.01) |
| H04M 3/51 | (2006.01) |
| G06Q 30/00 | (2012.01) |
| G06Q 10/06 | (2012.01) |
| G06F 11/34 | (2006.01) |
| G06F 11/30 | (2006.01) |
| H04M 3/42 | (2006.01) |
| H04M 7/12 | (2006.01) |

(52) U.S. Cl.
CPC .......... *H04M 3/28* (2013.01); *G06F 11/3006* (2013.01); *G06F 11/3409* (2013.01); *G06Q 10/06395* (2013.01); *G06Q 30/016* (2013.01); *H04M 3/5133* (2013.01); *H04M 3/5175* (2013.01); *H04M 3/5191* (2013.01); *H04M 3/42059* (2013.01); *H04M 7/1295* (2013.01); *H04M 2203/554* (2013.01)

(58) Field of Classification Search
CPC ......... G06F 11/3409; G06Q 10/06395; H04M 3/28; H04M 2203/554
See application file for complete search history.

(56) References Cited

U.S. PATENT DOCUMENTS

| | | | |
|---|---|---|---|
| 8,418,000 B1 | 4/2013 | Salame | |
| 8,576,991 B2 | 11/2013 | Geldenbott et al. | |
| 9,723,075 B2* | 8/2017 | Pino | ..... H04L 67/1095 |
| 2014/0098948 A1* | 4/2014 | Kulkarni | ..... H04L 51/046 |
| | | | 379/265.03 |
| 2018/0027116 A1 | 1/2018 | Dymshyts et al. | |
| 2018/0146093 A1* | 5/2018 | Kumar | ..... H04M 3/42221 |

* cited by examiner

*Primary Examiner* — Nafiz E Hoque
(74) *Attorney, Agent, or Firm* — Brian R. Galvin; Brian S. Boon; Galvin Patent Law, LLC

(57) ABSTRACT

A system comprising a call center, contact system test engine, plurality of networks, at least one remote server, at least one remote database, which allows users to automate call center testing and combine synchronized results for agent-customer calls (AX-CX test synchronization). The system is further accomplished with methods, using different techniques for synchronizing the testing for both customer and agent results, and producing these test results in a mobile dashboard and web-accessible dashboard.

16 Claims, 13 Drawing Sheets

US 10,326,880 B2

SYSTEM AND METHOD FOR INTEGRATED CX-AX CONTACT CENTER TESTING

PRIORITY CLAIMS

This application claims priority to U.S. provisional patent application Ser. No. 62/528,413, titled "SYSTEM AND METHOD FOR INTEGRATED CX-AX CONTACT CENTER TESTING" and filed on Jul. 3, 2017, the entire specification of which is incorporated herewith by reference.

BACKGROUND OF THE INVENTION

Field of the Art

The disclosure relates to the field of system testing, and more particularly to the field of automated quality assurance testing of contact center infrastructure, particularly during production operations, and even more particularly to integration of automated testing of customer experience ("CX") and agent experience ("AX") infrastructure for end-to-end quality assurance and monitoring.

Discussion of the State of the Art

As contact center software solutions—whether a single monolithic service or a set multiple service offerings from a number of vendors which together perform all needed tasks—have become more complex, so have systems and techniques needed monitor and test them. In the field of testing infrastructure in complex contact centers, two very different types of testing are performed using separate test platforms. Customer experience (CX) testing is done by generating real or synthetic interactions (e.g., phone calls, emails, etc.), and testing the routing, delivery, and handling of those interactions to verify that the CX is satisfactory (or, better, outstanding). Issues such as sound quality, wait times, accuracy of interactive voice response (IVR) scripts, and the like, are tested for CX validation. On the other hand, testing that targets the agent experience (AX) tends to focus on desktop computer performance, customer relationship management (CRM) software performance, and the like. Usually, these systems run separately, and results obtained in one may not be synchronized or compared directly with results obtained in the other.

What is needed are systems and methods for integrated CX-AX contact center testing. Such a system should be able to track and synchronize interactions across various technological boundaries. Such as system should make it possible to use a single test definition to conduct CX and AX testing, and the results should be seamlessly aggregated and uniform as to allow drilldown analysis of results of both ends of interaction.

SUMMARY OF THE INVENTION

Accordingly, the inventor has conceived and reduced to practice, according to various aspects, systems and methods for integrated CX-AX contact center testing.

According to an aspect, an object of the invention is to provide the ability to report on both the customer and agent components of the test from a linked test case definition, and seamless aggregation of both agent (AX) and inbound (CX) outcomes into a single (i.e., end-to-end) success/failure report. According to an aspect, a linkage between inbound test call outcomes and agent test call outcomes allowing for drilldown analysis is provided. From a high level the results will look similar, but the results of individual tests combine the outcome of both the inbound interaction (CX) steps and the agent behavior (AX) steps. This also makes it possible to conduct automated testing using a single test definition.

In one aspect of the invention, a system for automated and synchronized agent experience-customer experience testing of call center performance and technologies is provided, comprising a contact system test engine comprising a memory, a processor, and a plurality of programming instructions stored in the memory thereof and operable on the processor thereof, wherein the programmable instructions, when operating on the processor, cause the processor to generate an interaction sequence based at least on a user-provided test definition, wherein the generated interaction sequence comprises at least an identity marker; a synchronization service comprising a memory, a processor, and a plurality of programming instructions stored in the memory thereof and operable on the processor thereof, wherein the programmable instructions, when operating on the processor, cause the processor to assign a tracking identification number to the generated interaction sequence; and an agent station comprising a memory, a processor, and a plurality of programming instructions stored in the memory thereof and operable on the processor thereof, wherein the programmable instructions, when operating on the processor, cause the processor to receive the interaction sequence and the tracking identification number as part of an agent experience testing routine; and process the interaction sequence and at least logging timing and performance information; wherein, the contact system test engine compiles a customer experience test result report of the interaction sequence as it is received and processed by the agent station including at least the accuracy of responses to the generated interaction sequence and timing information; wherein, the contact system test engine compiles an agent experience result report based at least on the timing and performance logs of the agent station; wherein, the synchronization service synchronizes data between the agent result report and the customer result report into a synchronized report based at least the identity marker, the tracking identification number, logged timing information in each report; and wherein, the synchronized report is stored in a data store for future analysis.

In another embodiment of the invention, the identity marker is a calling line identity requested from the synchronization service. In another embodiment of the invention, the identity marker is a sequence of dual-tone multi-frequency signaling tones injected by the agent station. In another embodiment of the invention, the system further comprises a dashboard server comprising a memory, a processor, and a plurality of programming instructions stored in the memory thereof and operable on the processor thereof, wherein the programmable instructions, when operating on the processor, cause the processor to aggregate synchronized test results. In another embodiment of the invention, the interaction sequence is a sequence of simulated voice interactions. In another embodiment of the invention, the interaction sequence is a sequence of email interactions. In another embodiment of the invention, the interaction sequence is a sequence of web-based chat interactions. In another embodiment of the invention, the interaction sequence is a sequence of text-based interactions sent through a Short Message Service protocol.

In another aspect of the invention, a method for automated and synchronized agent experience-customer experience testing of call center performance and technologies, comprising the steps of: (a) generating an interaction sequence based at least on a user-provided test definition, wherein the generated interaction sequence comprises at least an identity marker, using a contact system test engine; (b) assigning a tracking identification number to the generated interaction sequence, using a synchronization service; (c) receiving the interaction sequence and the tracking identification number as part of an agent experience testing routine, using an agent station; (d) processing the interaction sequence and at least logging timing and performance information, using the agent station; (e) compiling a customer experience test result report of the interaction sequence as it is received and processed by the agent station including at least the accuracy of responses to the generated interaction sequence and timing information, using the contact system test engine; (f) compiling an agent experience result report based at least on the timing and performance logs of the agent station; (g) synchronizing data between the agent result report and the customer result report into a synchronized report based at least the identity marker, the tracking identification number, logged timing information in each report; and (h) storing the synchronized report in a data store for future analysis.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
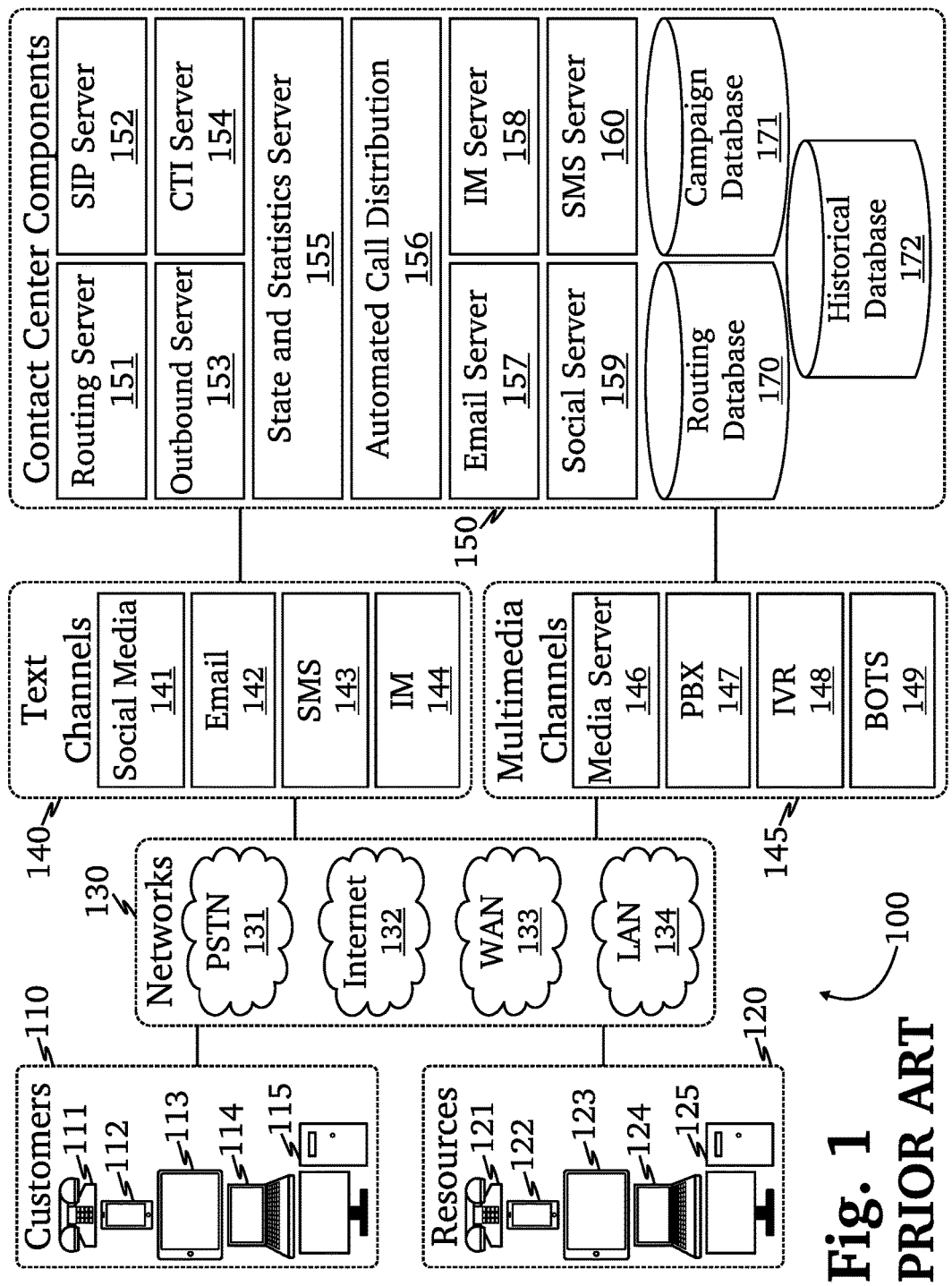
FIG. 1 (PRIOR ART) is a typical system architecture diagram of a contact center including components commonly known in the art.

The inventor has conceived, and reduced to practice, systems and methods for integrated CX-AX contact center testing.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 (PRIOR ART) is a typical system architecture diagram of a contact center 100, known to the art. A contact center is similar to a call center, but a contact center has more features. While a call center only communicates by voice, a contact center adds email, text chat such as but not limited to instant messaging, social media posts and SMS interaction, and web interfaces to voice communication in order to facilitate communications between a customer endpoint 110, and a resource endpoint 120, through a network 130, by way of at least one interface, such as a text channel 140 or a multimedia channel 145 which communicates with a plurality of contact center components 150. A contact center 100 is often operated through an extensive open workspace for agents with work stations that may include a desktop computer 125 or laptop 124 for each resource 120, along with a telephone 121 connected to a telecom switch, a mobile smartphone 122, and/or a tablet 123. A contact center enterprise may be independently operated or networked with additional centers, often linked to a corporate computer network 130. Resources are often referred to as agents, but for inside sales, for example, they may be referred to as sales representatives, or in other cases they may be referred to as service representatives, or collection agents, etc. Resource devices 120 may communicate in a plurality of ways, and need not be limited to a sole communication process. Resource devices 120 may be remote or in-house in a contact center, or out-sourced to a third party, or working from home. They handle communications with customers 110 on behalf of an enterprise. Resource devices 120 may communicate by use of any known form of communication known in the art be it by a telephone 121, a mobile smartphone 122, a tablet 123, a laptop 124, or a desktop computer 125, to name a few examples. Similarly, customers 110 may communicate in a plurality of ways, and need not be limited to a sole communication process. Customer devices 110 may communicate by use of any known form of communication known in the art, be it by a telephone 111, a mobile smartphone 112, a tablet 113, a laptop 114, or a desktop computer 115, to name a few examples. Communications by telephone may transpire across different network types, such as public switched telephone networks, PSTN 131, or via an internet network 132 for Voice over Internet Protocol (VoIP) telephony. Similarly, VoIP or web-enabled calls may utilize a Wide Area Network (WAN) 133 or a Large Area Network 134 to terminate on a media server 146. Network types are provided by way of example, only, and should not be assumed to be the only types of networks used for communications. Further, resource devices 120 and customer devices 110 may communicate with each other and with backend services via networks 130. For example, a customer calling on telephone handset 111 may connect through PSTN 131 and terminate on a private branch exchange, PBX 147, which is a type of multimedia channel 145. A video call originating from a tablet 123 may connect through an internet connection 132 and terminate on a media server 146. A customer device such as a smartphone 112 may connect via a WAN 133, and terminate on an interactive voice response unit, IVR 148, such as in the case of a customer calling a customer support line for a bank or a utility service. Text channels 140, may comprise social media 141, email 142, SMS 143 or as another form of text chat, IM 144, and would communicate with their counterparts, each respectively being social server 159, email server 157, SMS server 160, and IM server 158. Multimedia channels 145 may comprise at least one media server 146, PBX 147, IVR 148, and/or BOTS 149. Text channels 140 and multimedia channels 145 may act as third parties to engage with outside social media services and so a social server 159 inside the contact center will be required to interact with the third party social media 141. In another example, an email server 157 would be owned by the contact center 100 and would be used to communicate with a third party email channel 142. The multimedia channels 145, such as media server 146, PBX 147, IVR 148, and BOTS 149, are typically present in an enterprise's datacenter, but could be hosted in a remote facility or in a cloud facility or in a multifunction service facility. The number of communication possibilities are vast between the number of possible resource devices 120, customer devices 110, networks 130, channels 140/145, and contact center components 150, hence the system diagram on FIG. 1 indicates connections between delineated groups rather than individual connections for clarity.

Continuing on FIG. 1 (PRIOR ART), shown to the right of text channels 140, and multimedia channels 145, are a series of contact center components 150, including servers, databases, and other key modules that may be present in a typical contact center, and may work in a black box environment, and may be used collectively in one location or may be spread over a plurality of locations, or even be cloud-based, and more than one of each component shown may be present in a single location or may be cloud-based or may be in a plurality of locations or premises. Contact center components 150, may comprise a routing server 151, a SIP server 152, an outbound server 153, a computer telephony integration server CTI 154, a state and statistics server (also known and referred to herein as a STAT server) 155, an automated call distribution facility, ACD 156, an email server 157, an IM server 158, a social server 159, a SMS server 160, a routing database 170, a historical database 172, and a campaign database 171. It is possible that other servers and databases may exist within a contact center, but in this example, the referenced components are used. Continuing with the example given above, in some conditions where a single medium (such as ordinary telephone calls) is used for interactions that require routing, media server 146 may be more specifically a private branch exchange (PBX) 147, automated call distributor (ACD) 156, or similar media-specific switching system. Generally, when interactions arrive at media server 146, a route request, or a variation of a route request (for example, a SIP invite message), is sent to session initiation protocol SIP server 152, or to an equivalent system such as a computer telephony integration (CTI) server 154. A route request is a data message sent from a media-handling device such as media server 146 to a signaling system such as SIP server 152, the message comprising a request for one or more target destinations to which to send (or route, or deliver) the specific interaction with regard to which the route request was sent. SIP server 152 or its equivalent may, in some cases, carry out any required routing logic itself, or it may forward the route request message to routing server 151. Routing server 151 executes, using statistical data from state and statistics server (STAT server) 155 and (at least optionally) data from routing database 170, a routing script in response to the route request message and sends a response to media server 146 directing it to route the interaction to a specific target resource 120. In another case, routing server 151 uses historical information from a historical database 172, or real time information from campaign database 171, or both, as well as configuration information (generally available from a distributed configuration system, not shown for convenience) and information from routing database 170. STAT server 154 receives event notifications from media server 146 or SIP server 152 (or both) regarding events pertaining to a plurality of specific interactions handled by media server 146 or SIP server 152 (or both), and STAT server 155 computes one or more statistics for use in routing based on the received event notifications. Routing database 170 may of course be comprised of multiple distinct databases, either stored in one database management system or in separate database management systems. Examples of data that may normally be found in routing database 170 may include (but are not limited to): customer relationship management (CRM) data; data pertaining to one or more social networks (including, but not limited to network graphs capturing social relationships within relevant social networks, or media updates made by members of relevant social networks); skills data pertaining to a plurality of resources 120 (which may be human agents, automated software agents, interactive voice response scripts, and so forth); data extracted from third party data sources including cloud-based data sources such as CRM and other data from SALESFORCE.COM™, credit data from EXPERIAN™, consumer data from DATA.COM™; or any other data that may be useful in making routing decisions. It will be appreciated by one having ordinary skill in the art that there are many means of data integration known in the art, any of which may be used to obtain data from premise-based, single machine-based, cloud-based, public or private data sources as needed, without departing from the scope of the invention. Using information obtained from one or more of STAT server 155, routing database 170, campaign database 172, historical database 171, and any associated configuration systems, routing server 151 selects a routing target from among a plurality of available resource devices 120, and routing server 151 then instructs SIP server 152 to route the interaction in question to the selected resource device 120, and SIP server 152 in turn directs media server 146 to establish an appropriate connection between customer devices 110 and target resource device 120. In this case, the routing script comprises at least the steps of generating a list of all possible routing targets for the interaction regardless of the real-time state of the routing targets using at least an interaction identifier and a plurality of data elements pertaining to the interaction, removing a subset of routing targets from the generated list based on the subset of routing targets being logged out to obtain a modified list, computing a plurality of fitness parameters for each routing target in the modified list, sorting the modified list based on one or more of the fitness parameters using a sorting rule to obtain a sorted target list, and using a target selection rule to consider a plurality of routing targets starting at the beginning of the sorted target list until a routing target is selected. It should be noted that customer devices 110 are generally, but not necessarily, associated with human customers or users. Nevertheless, it should be understood that routing of other work or interaction types is possible, although in any case, is limited to act or change without input from a management team.

Figure 2:
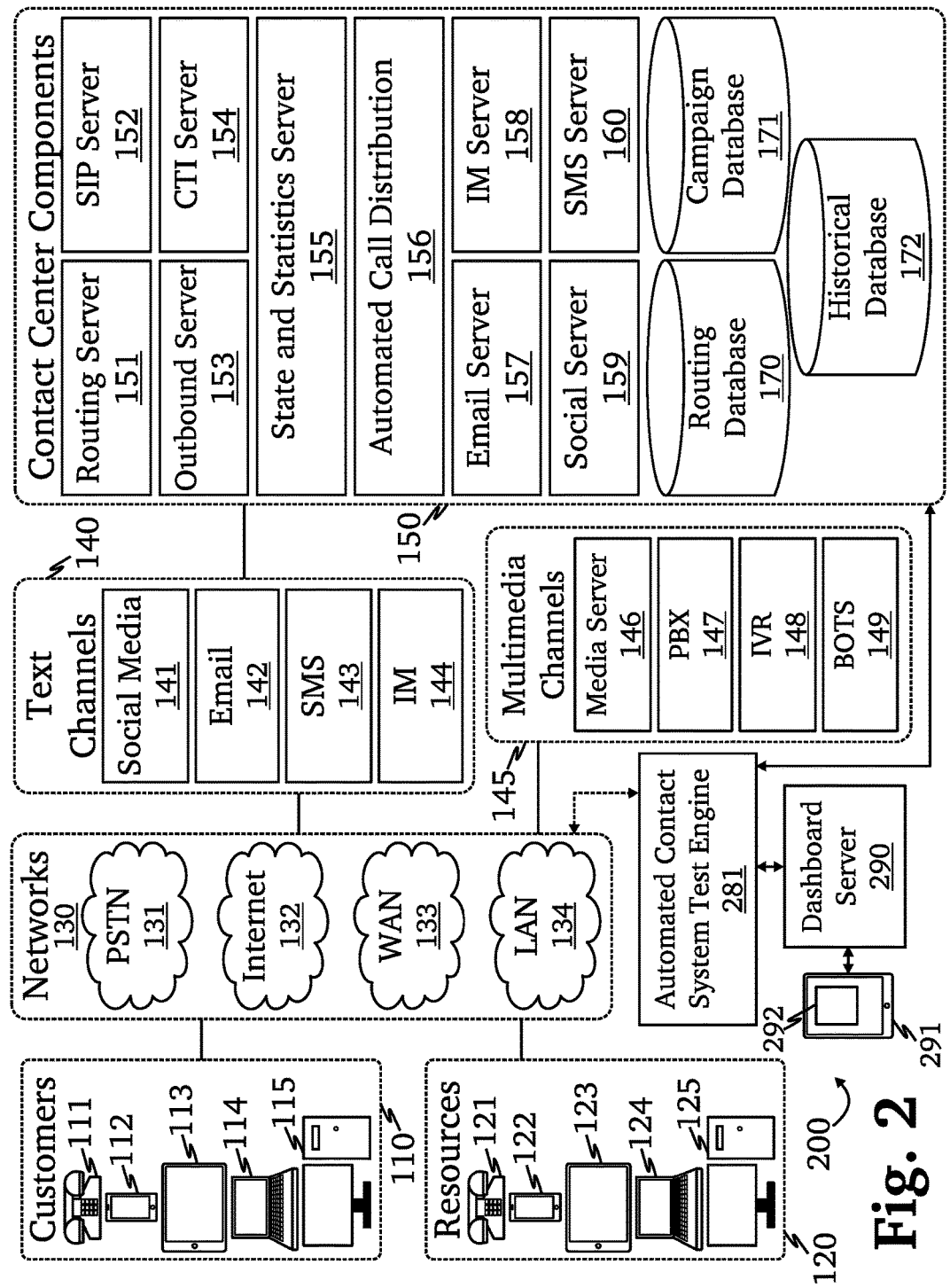
FIG. 2 is a block diagram illustrating an exemplary system architecture for an automated contact center test engine with a mobile dashboard app, according to a preferred aspect of the invention

FIG. 2 is a block diagram illustrating an exemplary system architecture 200 for an automated contact center test system comprising a mobile dashboard application 292 operable on a mobile device 291 comprising at least a processor to operate mobile dashboard application 292 and a memory to store mobile dashboard application 292 and a dashboard server 290, according to a preferred embodiment of the invention. According to the embodiment, system 200 may comprise an automated end-to-end contact center testing system 281 operating on at least one network 130 as illustrated. A plurality of customers 110 and network-connected resources 120 may connect to a contact center 150 via a network 130 using a variety of specific communication means such as including (but not limited to) text-based communication channels 140 such as social media networks 141, email messages 142, SMS messaging 143 or IP-based instant messaging 144, or via multimedia communication channels 145 such as via a media server 146, a private branch exchange (PBX) 147, an interactive voice response (IVR) system 148, or via communication bots 149 that may automate or simulate communication (as may be used for testing purposes without relying on actual customer communication). Communication may occur over a variety of network types 130, such as (again, including but not limited to) a public switched telephone network (PSTN) 131, the Internet 132 or other wide-area network (WAN) 133, or a local-area network (LAN) 134, according to various arrangements. For example, internal testing may occur exclusively within a LAN, while testing of online helpdesk interactions may use Internet-connected IM or email, or other arrangements.

A contact center may comprise a number of systems and features common in the art, such as for example a routing server 151 that directs other components based on routing instructions from a routing database 170 to route interactions to appropriate handling endpoints (such as agents to answer calls or IMs), a session initiation protocol (SIP) server 152 that handles SIP-based telephony, an outbound server 153 that processes outbound interaction attempts such as customer callbacks, state and statistics server 155 that manages internal contact center state monitoring and statistics (for example, tracking interaction metrics such as handle time, queue wait time, number of interactions handled or transferred, and other various metrics that are commonly tracked in contact center operations), or an automated call distributor (ACD) that may be used to automatically distribute interactions to endpoints, (for example based on customer input or agent skills). Additionally, a variety of interaction servers may be used to appropriately receive, process, and handle interactions such as a computer-telephony integration (CTI) server 154 that may be used to connect telephony and computer-based or IP technologies, email server 157 that may be used to handle email-based interactions, instant messaging (IM) server 158 that may be used to handle web-based instant messaging, social server 159 that may be used to handle content from social media networks (such as communicating directly with a social network's public API, for example to read and process content and user messages), or short message service (SMS) server 160 that may be used to handle SMS-based text messages. Additionally, contact center campaign information (for example, metric goals pertaining to a particular customer or campaign) may be stored in a campaign database 171 for reference, and historical interaction information may be stored in an historical database 172 such as to store call recording for later reference or analysis. According to an aspect, dashboard server 290 may be configured by properly authorized users, the configuration determining what information is available, in what form, for use in mobile dashboard applications 292 operating on mobile devices 291; once configured, dashboard server 290 receives data in real time from the various other components of test system 200, and in particular automated contact center test engine 281, and transmits the data, optionally aggregated and/or analyzed, to a plurality of mobile devices 290 via a wireless network, for display on a plurality of mobile dashboard applications 292.

Figure 3:
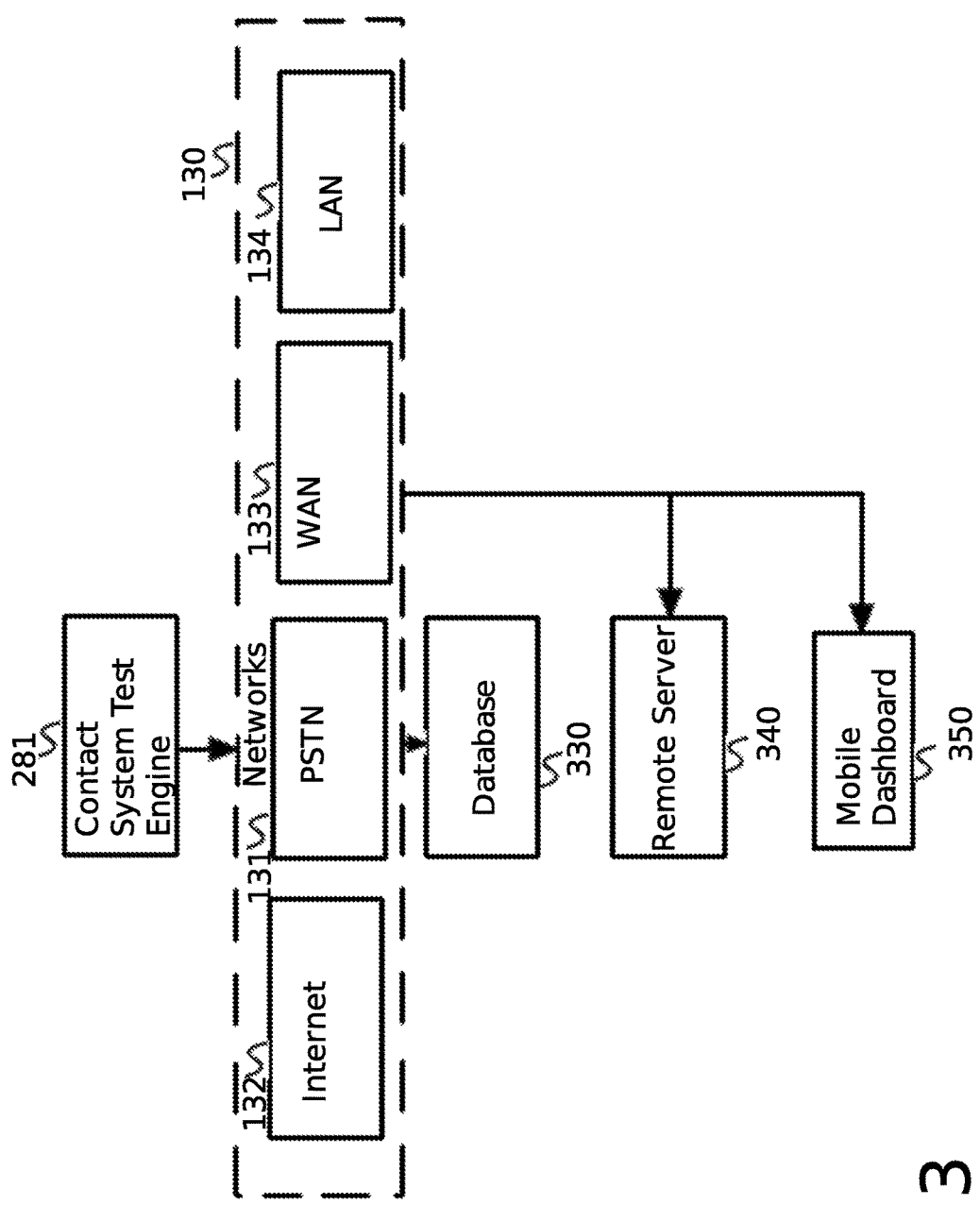
FIG. 3 shows an exemplary system diagram, according to an aspect, illustrating the connection between the testing engine and the mobile dashboard.

FIG. 3 shows a diagram of an exemplary connection between a contact system test engine 281 and a mobile dashboard 350, which may be part of a dashboard server 290 referring to FIG. 2, according to a preferred aspect of the invention. A contact system test engine 281 may connect to one of a plurality of network types 130, including the internet 132, a public switched telephone network or PSTN 131 on which to run tests, a wide area network or WAN 133 and a local area network 134 in order to connect to a database 330. Through a possible plurality of networks 130 the database may then be queried by a remote server 340, and test data may be queried, to be shown to a user's mobile dashboard 350, again through communication with a possible plurality of networks, according to a preferred aspect of the invention. A mobile dashboard 350 may either be given the data from a remote server 340 through API calls such as GET, POST, or PUT, or through a live connection to the server 340, or through other common means for a mobile application to communicate with a remote server, as anyone skilled in the art would be aware of.

Figure 7:
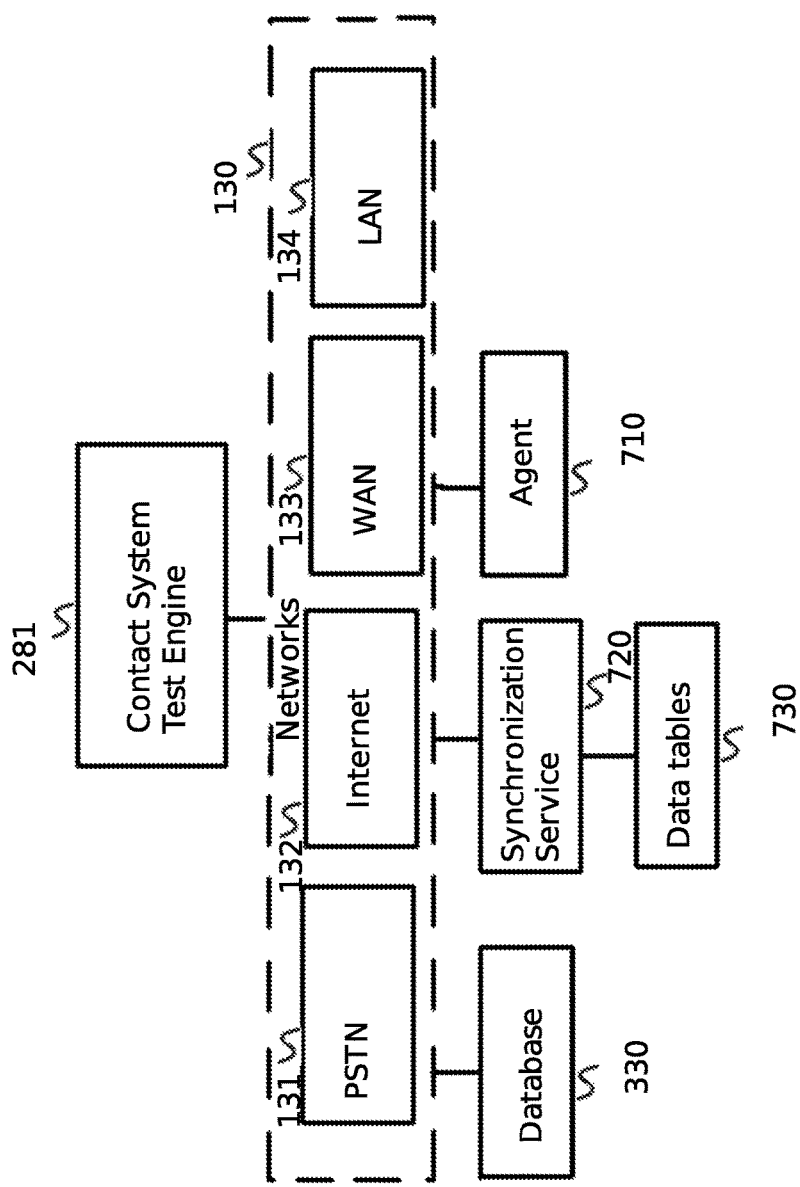
FIG. 7 is a block diagram illustrating a system architecture for test engine synchronization.

FIG. 7 shows an exemplary block diagram illustrating system architecture, showing connections between the contact system test engine 281, a plurality of possible networks 130 including PSTN 131, Internet 132, WAN 133 and/or LAN 134, a remote database 330 as shown in FIG. 3, and a synchronization service 720, with data tables 730, and an agent station 710. A contact system test engine 281 may be connected through a network, possibly through the Internet 132 or a LAN 134, to a database 330 in order to retrieve and/or store information, as is typical for a database-driven system to do in the art. Different database software may be used according to a preferred aspect-such software may include MySQL, Microsoft SQL, Oracle Database, or other database software systems. A database 330 may then be connected to and queried by a synchronization service 720 which may hold its own data tables 730, which may be used for storing local data or cross-referencing data with the remote database 330. A connection between the synchronization service 720 and the contact system test engine 281, and an agent 710, is also present, using possibly a plurality of networks 130 described according to a preferred aspect. Such networks may include PSTN 131, the Internet 132, or any other networks described such as a WAN 133 or LAN 134, according to a preferred aspect of the invention.

DESCRIPTION OF METHOD EMBODIMENTS

Figure 4:
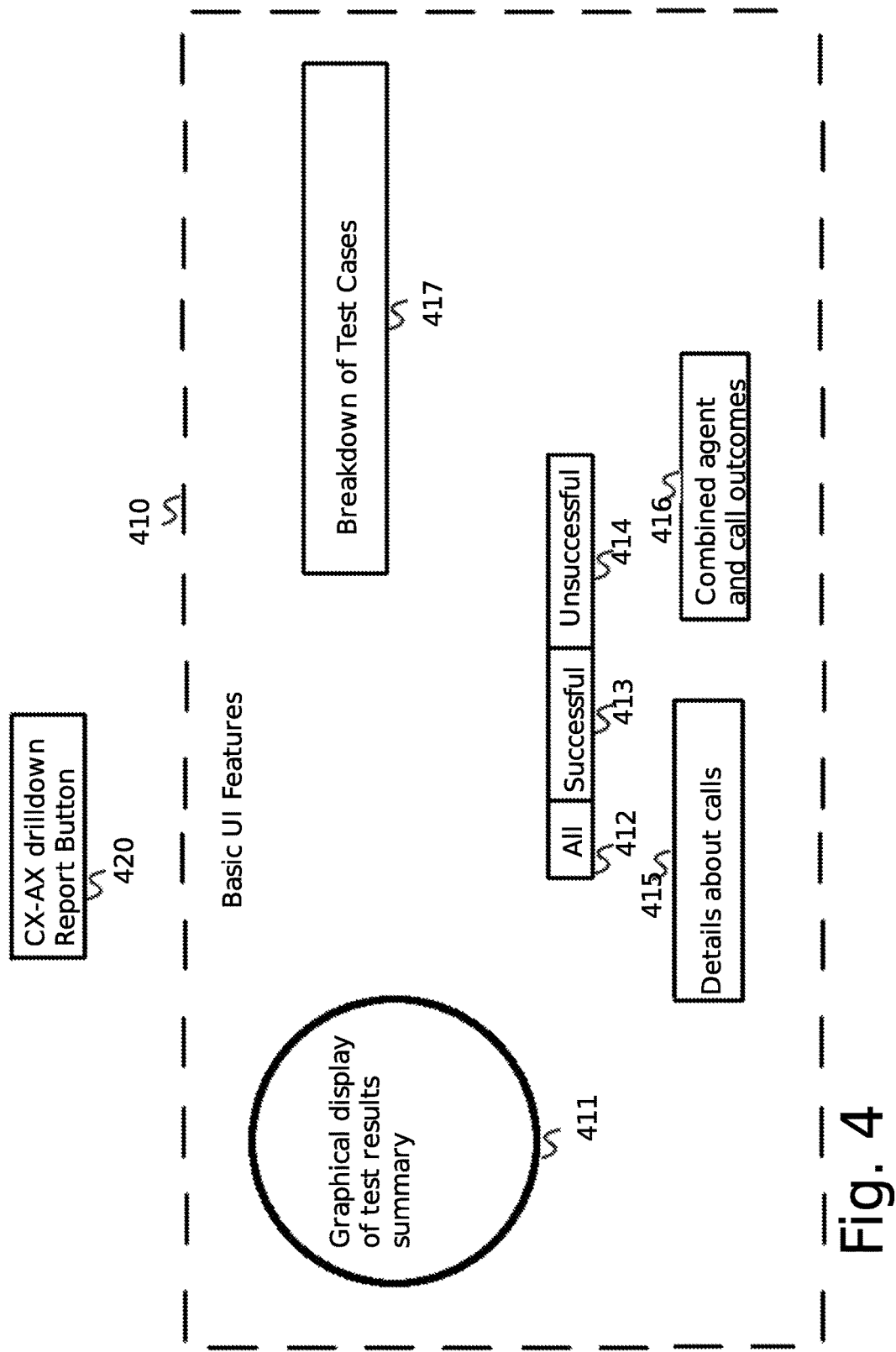
FIG. 4 shows an exemplary method diagram, according to an aspect, illustrating basic UI elements and functionality for a combined AX-CX reporting web page.

FIG. 4 shows an exemplary user interface depiction, according to a preferred aspect of the invention, showing critical call campaign details as gained from database 330, on a web page accessible with a browser or viewable on a mobile dashboard 350. The user interface depicts basic UI features 410 which contain useful industry information as garnered from the contact test engine 281. Such features may include, as described by a preferred aspect of the invention, in similar or different graphical displays as shown in FIG. 4, information such as a graphical display of test results 411, which may display the totality of successful and unsuccessful tests in a pleasing graphical image. More information depicted may include, according to a preferred aspect of the invention, a breakdown of test cases 417, which may include a textual display of statistics regarding the totality of test cases for a campaign. Further information which may be depicted may include details about the calls in question 415, and a listing of combine AX-CX call outcomes 416. This information may be filtered by buttons which may show all of the call data 412, or only data for some calls which may have been successful 413, or only data for calls which were unsuccessful 414. A button may also be included which has unique functionality, to bring a user to a new page of information for CX-AX drilldown reporting 420, where more information may be viewed, according to a preferred aspect of the invention.

Figure 5:
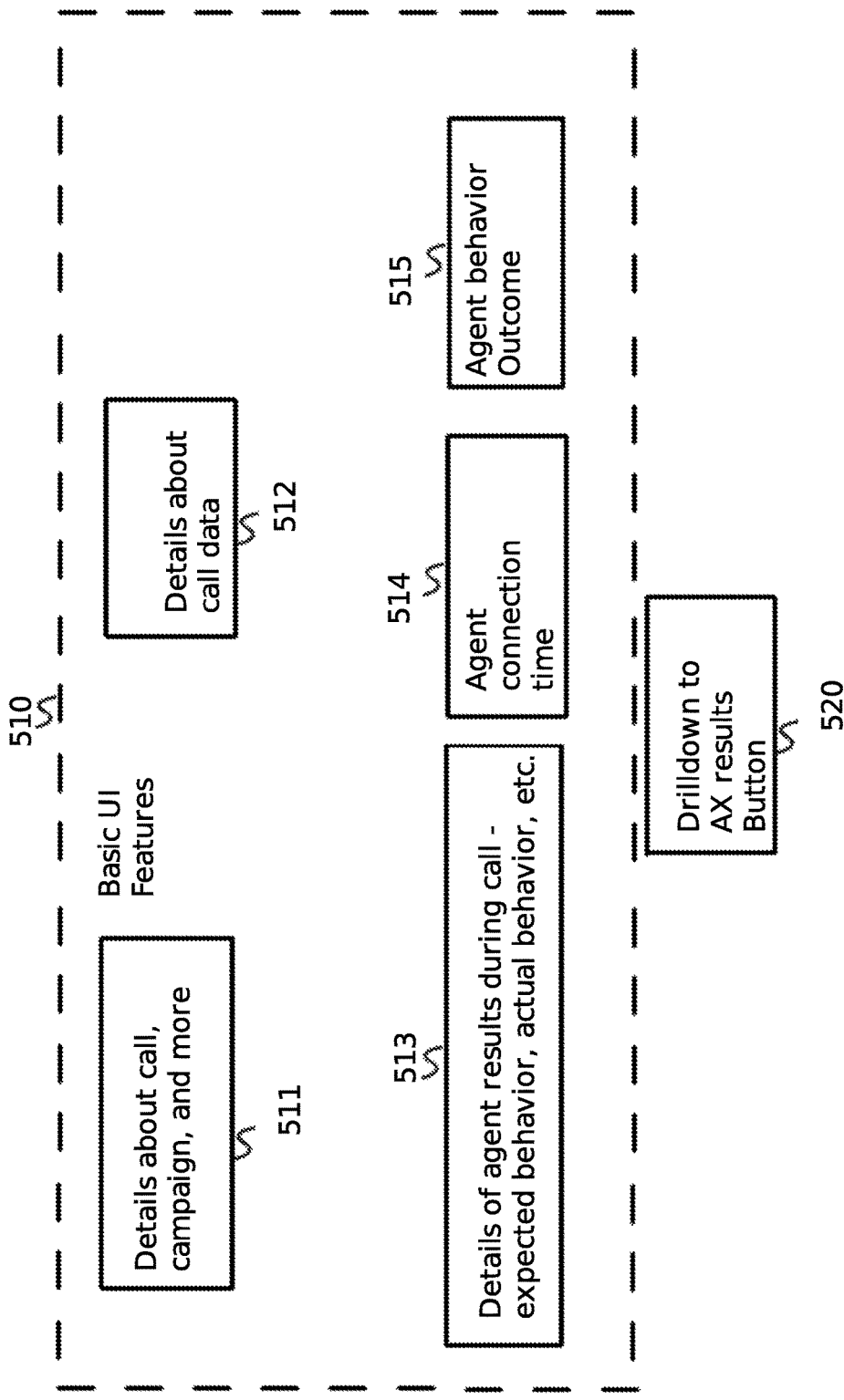
FIG. 5 shows an exemplary method diagram, according to an aspect, illustrating basic UI elements and functionality for AX reporting.

FIG. 5 shows an exemplary user interface diagram, according to a preferred aspect of the invention, illustrating combined CX-AX reporting drilldown. When a user engages with the button 420 in FIG. 4, through either tapping, clicking, or some other common interaction known to those proficient in the art, they are taken to a new page of information, where the user interface displays new data 510. Information that may be included according to a preferred aspect of the invention may be further details about a campaign and the calls within it 511, details about the data itself 512 (sometimes termed metadata in the industry), and agent call behavior data 513 including what was expected, what actually occurred, and possibly more data according to a preferred aspect of the invention. Agent connection time 514 may also be included as this is important information in the industry, and the outcome of the call 515 is also recorded. A button is further provided which allows a drilldown report for agent results 520, according to a preferred aspect of the invention.

Figure 6:
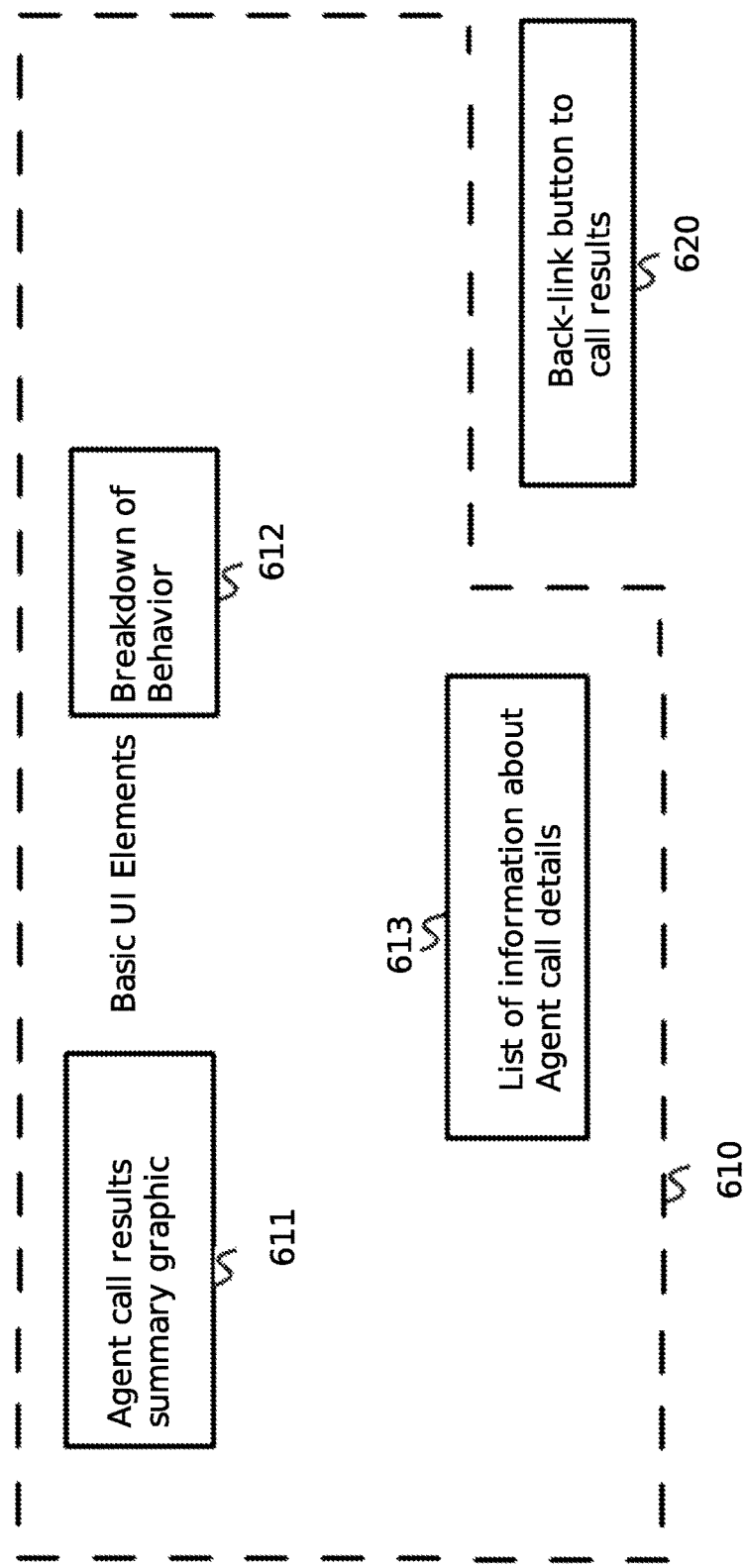
FIG. 6 shows an exemplary method diagram, according to an aspect, illustrating basic UI elements and functionality for AX drill-down reporting.

FIG. 6 shows an exemplary user interface diagram, accessible from button 520 shown in FIG. 5. Shown in FIG. 6 are several user interface aspects 610, including a graphic demonstrating the sum total of agent call results 611, a breakdown of data gathered on agent behavior 612, and a list of information about an agent's calls 613, as would be required in the industry. A button exists 620 to take a user back to call results, FIG. 4.

In order to support the capability to provide CX-AX linked reporting, according to an aspect, a plurality of mechanisms is provided to allow for reporting and test case synchronization to be performed automatically as a part of the execution of the inbound/CX and agent/AX test campaigns. In order to synchronize the customer and agent ends of a communication session, it may be necessary to find a unique piece of data that links the session across the two disparate systems, for example, an interaction generator and an agent station. This may be accomplished by finding existing interaction data that exists temporarily at each system such as caller line identification (CLI), or via data that is specifically injected down the interaction channel. Examples of each of the mentioned identification methods are detailed below. Additionally, by synchronizing the test results of both ends of a test, it may also become possible to unifying test definitions used in a testing environment, as any delineations between agent testing and customer testing may be remedied by the unification of the test results.

Figure 8:
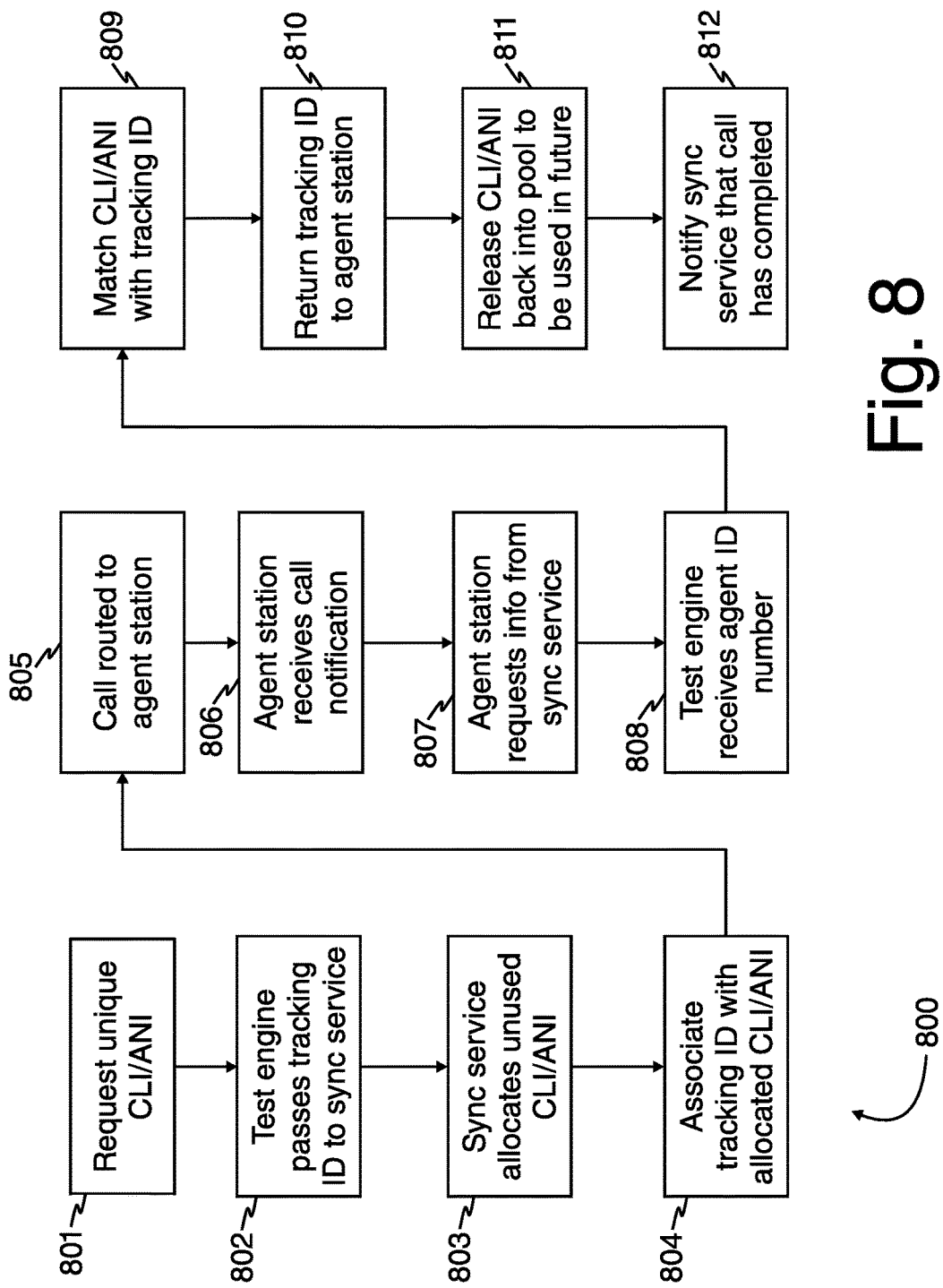
FIG. 8 is a flow diagram illustrating an exemplary method for CLI/ANI driven synchronization of call testing.

Shown in FIG. 8 is a flow diagram illustrating an exemplary method 800 for calling line identity (CLI)/automatic number identification (ANI) driven synchronization of call testing according to a preferred aspect of the invention. The CLI/ANI generally refers to the caller ID, which generally comprises a phone number and identifying information (such as a name). Details of these steps are only one possible implementation of the basic steps and should not be construed to hinder the disclosure in any way. At a first step 801, test engine 281 may request from synchronization service 720 an unused CLI/ANI to assign to a call generated for testing purposes. At step 802, the test engine may pass a unique tracking ID number for the generated call to the synchronization service in the process. The tracking ID may be used to track the call as it is routed from point to point during any particular test case. The next step in the method, according to a preferred aspect of the invention, step 803, the synchronization service allocates an unused CLI/ANI number from a pool of unused numbers for the generated call. At step 804, the synchronization service may then associate the allocated CLI/ANI with the assigned tracking ID, which may then be recorded in data table 730. At step 805, the call may then be routed to an agent station 710. In a preferred embodiment, the agent station may be operated by a virtual agent configured to be used in this test case, but in some embodiments the agent station may be operated by a live agent tasked with participating in the test. At step 806, the agent station receives notification of the incoming call, along with the CLI/ANI. At step 807, the agent station may request info from the synchronization service for any additional information pertaining to the incoming CLI/ANI. The request may be accompanied by an agent ID number assigned to this particular agent station. At step 808, the testing engine may receive an event indicating that the call has arrived at the agent station. The event may also be accompanied with additional information, such as the agent ID, timestamps, length of ringing time for the call, and the like. The event, along with any additional information, may then be stored into the data tables. At step 809, the synchronization service may match the CLI/ANI to the tracking ID, previously assigned in step 802. At this point, standard testing of CX and AX may be conducted and completed. Reports may be generated based on results of the testing. At step 810, the tracking ID may then be returned to the agent station, which may be recorded in the AX test results, and used to establish a link between the AX test results and CX test results. At step 811, the testing system may release the CLI/ANI, making it available to be used in future test cases. At step 812, upon test completion, the agent station may signal back to the synchronization service to notify the test engine that the call is completed, and make a record of the call completion.

Figure 9:
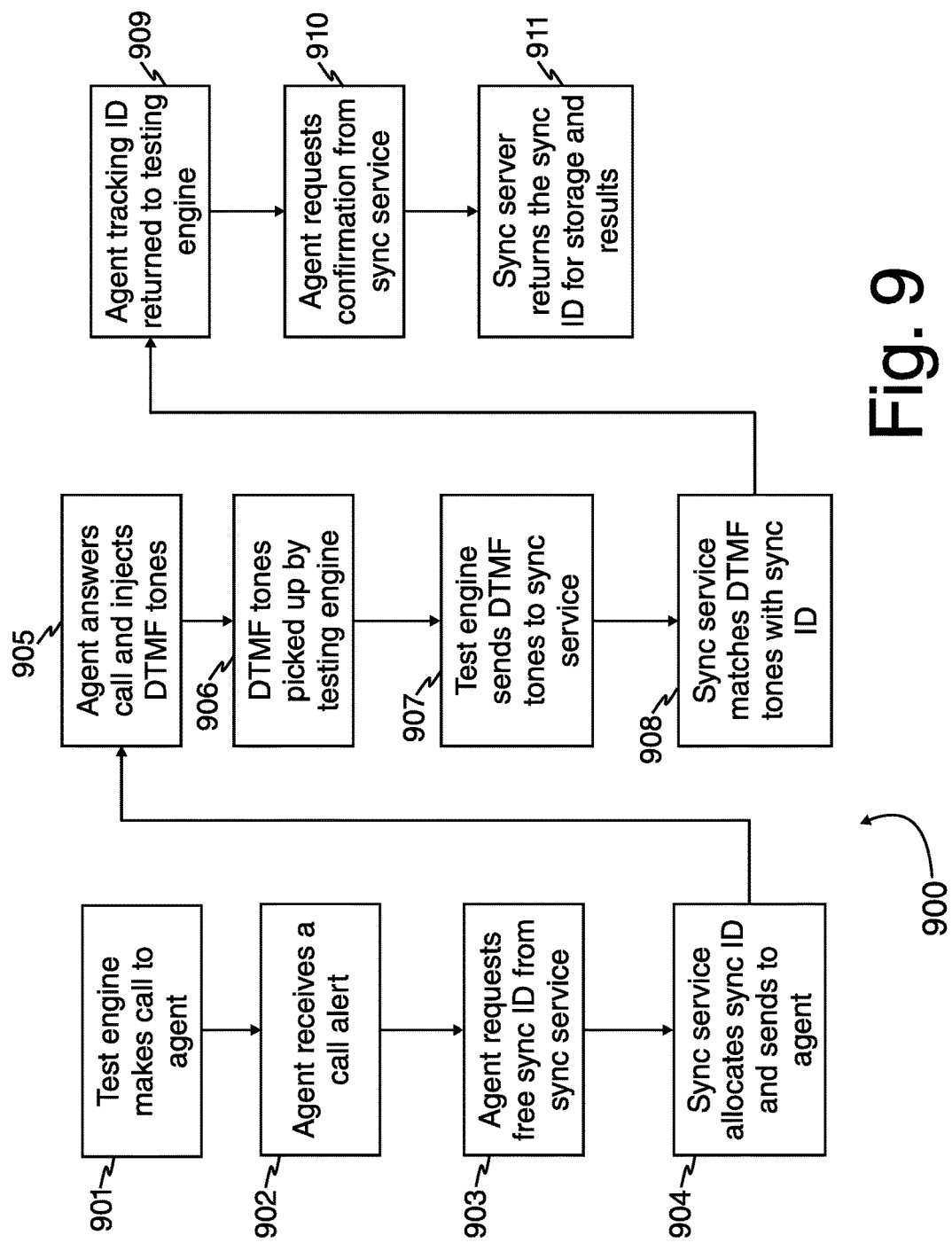
FIG. 9 is a flow diagram illustrating an exemplary method for In-Band signaling driven synchronization of call testing.

FIG. 9 is a flow diagram illustrating an exemplary method 900 for in-band signaling driven synchronization of call testing according to various embodiments of the invention. While similar to method 800, method 900 relies on a sequence of DTMF tones injected into the call once the agent station answers an incoming call as an identifier, as opposed to assigning CLI/ANI information to generated calls. At an initial step 901, test engine 281 generates and routes a call to agent station 710. At step 902, the agent station receives a call alert. At step 903, the agent station sends a request to a synchronization service 720 for an unused synchronization ID. The request may be accompanied by an agent ID number assigned to this particular agent station. At step 904, the synchronization service allocates a synchronization ID, and forwards it to the agent station. The synchronization service may then associate the allocated sync ID with the agent ID, and record the association in data table 730. At step 905, the agent station answers the incoming call and injects a DTMF tone sequence, which may correspond to the synchronization ID received in step 904, at the start of the call. The DTMF tone may, for example, comprise a string of delimiters and numbers, such as "##1234567899999##". In some embodiments, as a safeguard against line degradation, the sequence may be sent multiple times, each time being accompanied by a checksum to be used for error-checking, for example, using a Verhoeff algorithm operation with a corresponding checksum. At step 906, the DTMF tones may be picked up by the test engine, and registered as a means to identify the call. At step 907, the test engine may then send a request to the synchronization service containing the DTMF sequence. The request may also be accompanied by the agent ID. At step 908, the synchronization service may match the DTMF tone sequence with the previously registered synchronization ID. At this point, standard testing of CX and AX may be conducted and completed. Reports may be generated based on results of the testing. At step 909, the agent ID is returned to the test engine to be stored with the CX test results. A link may then be established between the activity record of the AX test and CX test. At step 910, the test engine may send a request to the synchronization service for confirmation that the call has been synchronized. At step 911, the synchronization server may return the synchronization ID for storage and cross-referencing of results for the CX and AX tests.

It will be appreciated by one skilled in the art that for methods 800 and 900, other types of incoming interactions may be used in place of the call used in the provided examples. Each type may have their own ways to identify the incoming interactions, for example, email messages may be tracked using unique information embedded in the header information of the email, SMS messages may contain an identifying alphanumeric string in the body of the text, a web chat message may be identified with an alphanumeric string sent when a connection is established, and the like.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 10:
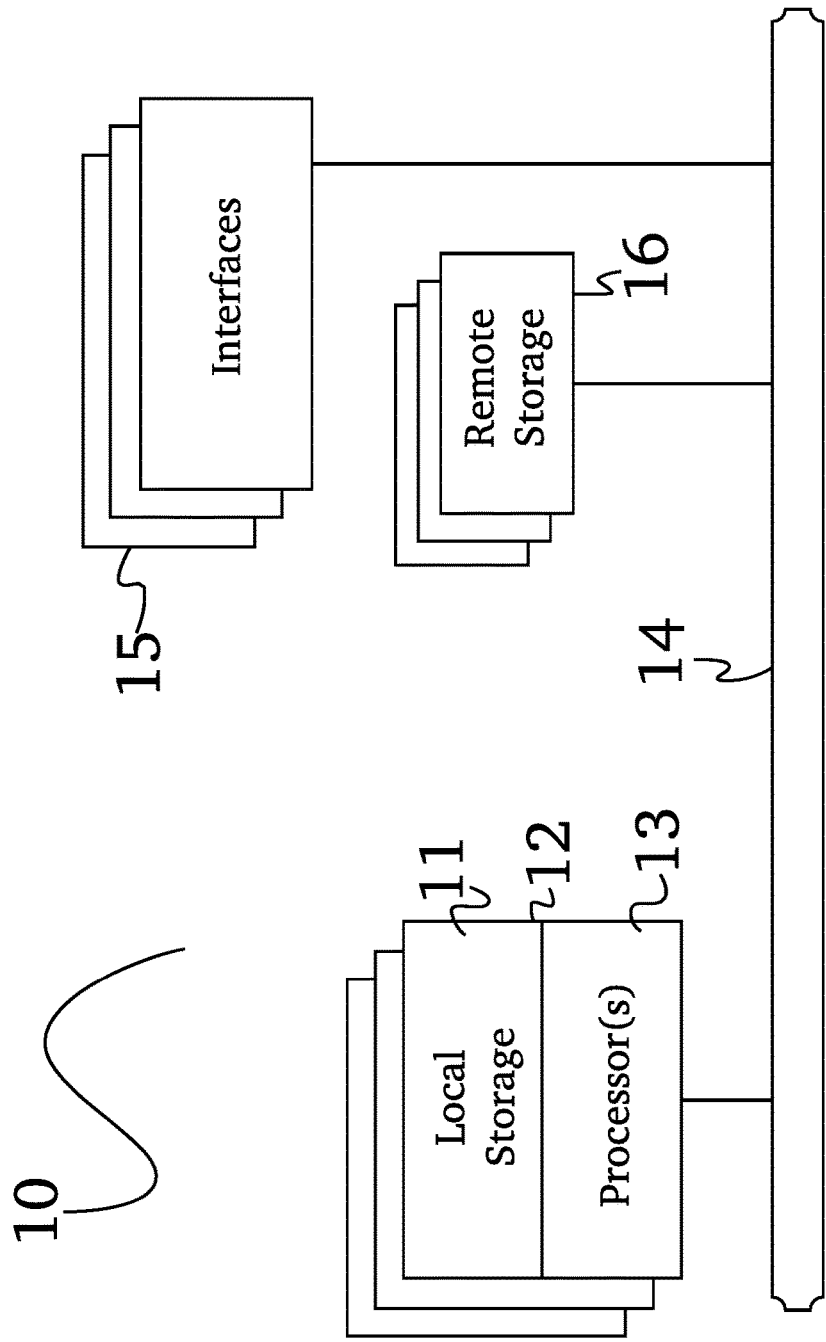
FIG. 10 is a block diagram illustrating an exemplary hardware architecture of a computing device.

Referring now to FIG. 10, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/N hardware interfaces) and, in some instances, volatile and/or non-volatile memory (e.g., RAM).

Although the system shown in FIG. 10 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 11:
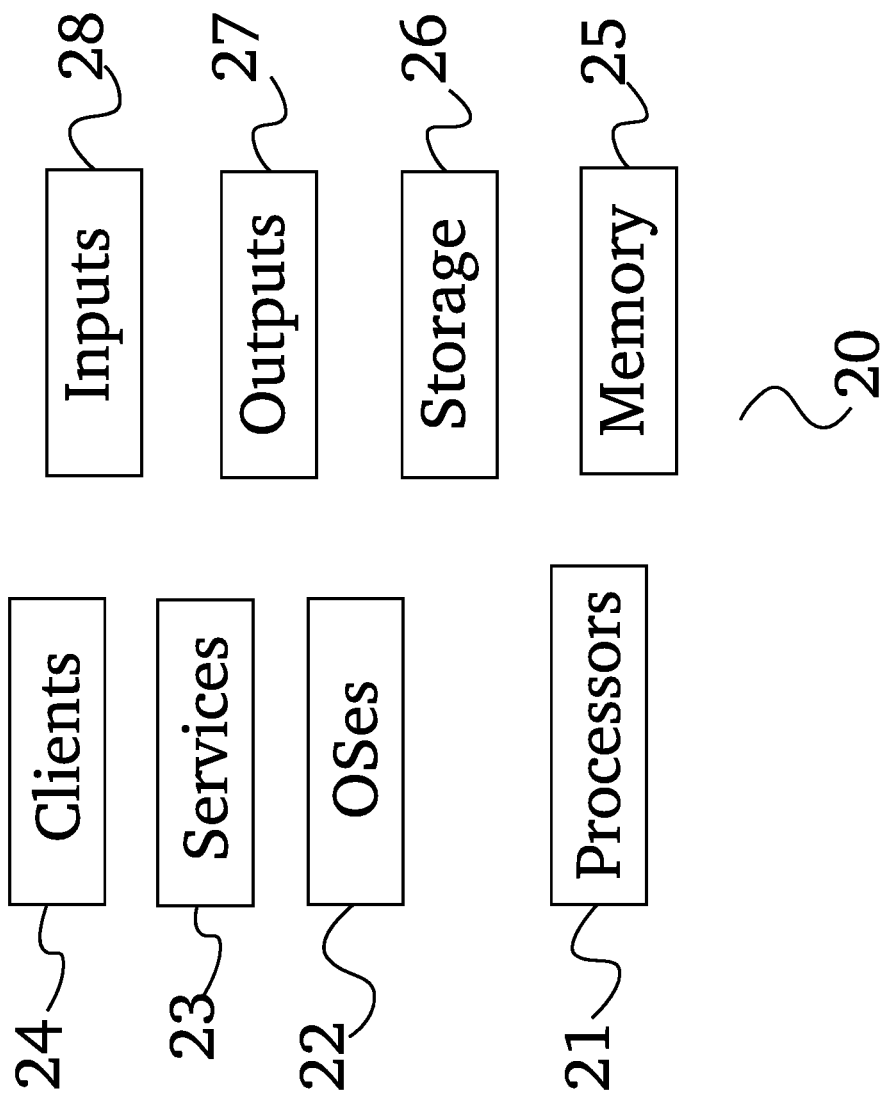
FIG. 11 is a block diagram illustrating an exemplary logical architecture for a client device.

In some embodiments, systems according to the present invention may be implemented on a standalone computing system. Referring now to FIG. 11, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 10). Examples of storage devices 26 include flash memory, magnetic hard drive, CD-ROM, and/or the like.

Figure 12:
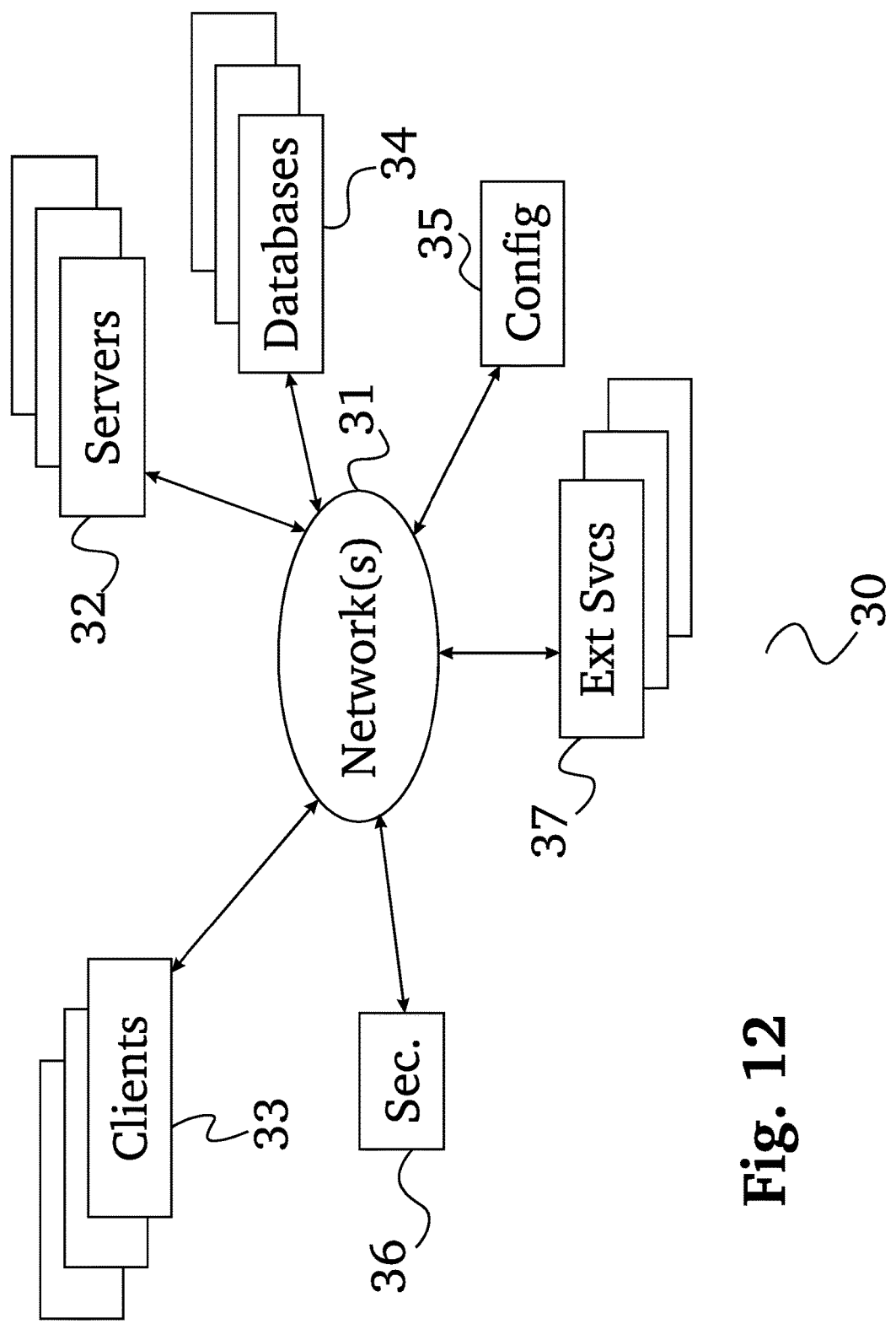
FIG. 12 is a block diagram showing an exemplary architectural arrangement of clients, servers, and external services.

In some embodiments, systems of the present invention may be implemented on a distributed computing network, such as one having any number of clients and/or servers. Referring now to FIG. 12, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 11. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 13:
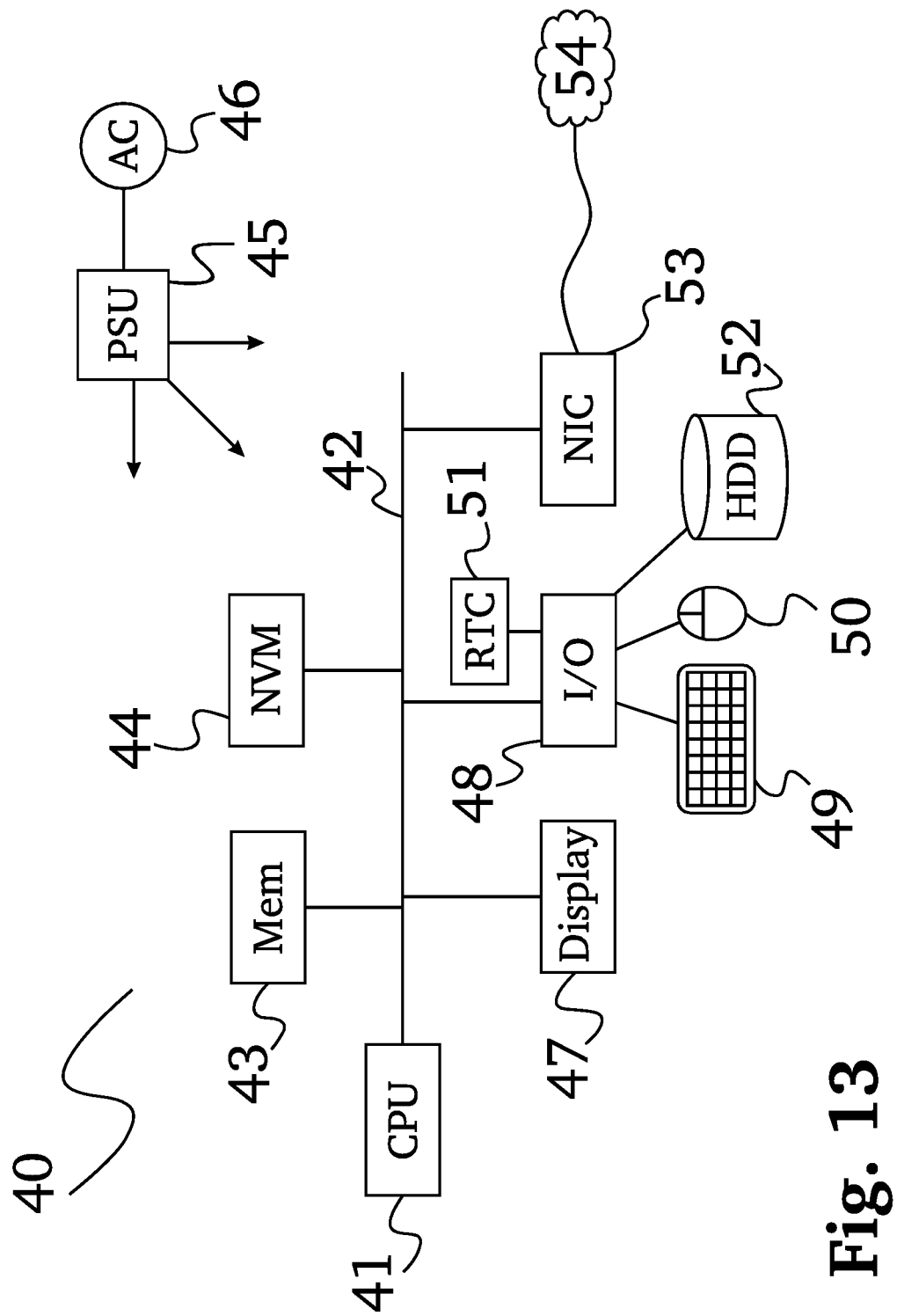
FIG. 13 is another block diagram illustrating an exemplary hardware architecture of a computing device.

FIG. 13 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for automated and synchronized agent experience-customer experience testing of call center performance and technologies, comprising:
    a contact system test engine comprising a memory, a processor, and a plurality of programming instructions stored in the memory thereof and operable on the processor thereof, wherein the programmable instructions, when operating on the processor, cause the processor to:
        generate an interaction sequence based at least on a user-provided test definition, wherein the generated interaction sequence comprises at least an identity marker;
    a synchronization service comprising a memory, a processor, and a plurality of programming instructions stored in the memory thereof and operable on the processor thereof, wherein the programmable instructions, when operating on the processor, cause the processor to:
        assign a tracking identification number to the generated interaction sequence;
    an agent station comprising a memory, a processor, and a plurality of programming instructions stored in the memory thereof and operable on the processor thereof, wherein the programmable instructions, when operating on the processor, cause the processor to:
        receive the interaction sequence and the tracking identification number as part of an agent experience testing routine;
        process the interaction sequence;
        log timing and performance information;
    wherein, the contact system test engine compiles a customer experience test result report of the interaction sequence as it is received and processed by the agent station including at least the accuracy of responses to the generated interaction sequence and timing information;
    wherein, the contact system test engine compiles an agent experience result report based at least on the timing and performance logs of the agent station;
    wherein, the synchronization service synchronizes data between the agent result report and the customer result report into a synchronized report based at least the identity marker, the tracking identification number, logged timing information in each report; and
    wherein, the synchronized report is stored in a data store for future analysis.

2. The system of claim 1, wherein the identity marker is a calling line identity requested from the synchronization service.

3. The system of claim 1, wherein the identity marker is a sequence of dual-tone multi-frequency signaling tones injected by the agent station.

4. The system of claim 1, further comprising a dashboard server comprising a memory, a processor, and a plurality of programming instructions stored in the memory thereof and operable on the processor thereof, wherein the programmable instructions, when operating on the processor, cause the processor to aggregate synchronized test results.

5. The system of claim 1, wherein the interaction sequence is a sequence of simulated voice interactions.

6. The system of claim 1, wherein the interaction sequence is a sequence of email interactions.

7. The system of claim 1, wherein the interaction sequence is a sequence of web-based chat interactions.

8. The system of claim 1, wherein the interaction sequence is a sequence of text-based interactions sent through a Short Message Service protocol.

9. A method for automated and synchronized agent experience-customer experience testing of call center performance and technologies, comprising the steps of:
- (a) generating an interaction sequence based at least on a user-provided test definition, wherein the generated interaction sequence comprises at least an identity marker, using a contact system test engine;
- (b) assigning a tracking identification number to the generated interaction sequence, using a synchronization service;
- (c) receiving the interaction sequence and the tracking identification number as part of an agent experience testing routine, using an agent station;
- (d) processing the interaction sequence and at least logging timing and performance information, using the agent station;
- (e) compiling a customer experience test result report of the interaction sequence as it is received and processed by the agent station including at least the accuracy of responses to the generated interaction sequence and timing information, using the contact system test engine;
- (f) compiling an agent experience result report based at least on the timing and performance logs of the agent station;
- (g) synchronizing data between the agent result report and the customer result report into a synchronized report based at least the identity marker, the tracking identification number, logged timing information in each report; and
- (h) storing the synchronized report in a data store for future analysis.

10. The method of claim 9, wherein the identity marker is a calling line identity requested from the synchronization service.

11. The method of claim 9, wherein the identity marker is a sequence of dual-tone multi-frequency signaling tones injected by the agent station.

12. The method of claim 9, further comprising a dashboard server comprising a memory, a processor, and a plurality of programming instructions stored in the memory thereof and operable on the processor thereof, wherein the programmable instructions, when operating on the processor, cause the processor to aggregate synchronized test results.

13. The method of claim 9, wherein the interaction sequence is a sequence of simulated voice interactions.

14. The method of claim 9, wherein the interaction sequence is a sequence of email interactions.

15. The method of claim 9, wherein the interaction sequence is a sequence of web-based chat interactions.

16. The method of claim 9, wherein the interaction sequence is a sequence of text-based interactions sent through a Short Message Service protocol.

* * * * *